United States Patent
Kurpan

(10) Patent No.: US 9,488,503 B2
(45) Date of Patent: Nov. 8, 2016

(54) CART MOVEMENT DETECTION SYSTEM FOR A DYNAMICS TRACK

(71) Applicant: Vernier Software & Technology LLC, Beaverton, OR (US)

(72) Inventor: Vince Kurpan, Hillsboro, OR (US)

(73) Assignee: Vernier Software & Technology, LLC, Beaverton, OR (US)

(*) Notice: Subject to any disclaimer, the term of this patent is extended or adjusted under 35 U.S.C. 154(b) by 210 days.

(21) Appl. No.: 14/529,079

(22) Filed: Oct. 30, 2014

(65) Prior Publication Data

US 2015/0192435 A1    Jul. 9, 2015

Related U.S. Application Data

(60) Provisional application No. 61/923,597, filed on Jan. 3, 2014.

(51) Int. Cl.
| | |
|---|---|
| *G01D 5/347* | (2006.01) |
| *G01P 3/38* | (2006.01) |
| *G01P 3/481* | (2006.01) |
| *G01P 13/04* | (2006.01) |

(52) U.S. Cl.
CPC .......... *G01D 5/34746* (2013.01); *G01P 3/38* (2013.01); *G01P 3/481* (2013.01); *G01P 13/045* (2013.01)

(58) Field of Classification Search
CPC ..... G01D 5/34746; G01P 13/00; G01P 3/36; G01P 13/045

USPC .......................................... 250/231.13–231.18
See application file for complete search history.

(56) References Cited

U.S. PATENT DOCUMENTS

| | | | | |
|---|---|---|---|---|
| 4,736,187 A * | 4/1988 | Kibrick | ............... | G01D 5/2457 250/231.14 |
| 4,914,437 A * | 4/1990 | Kibrick | ............... | H03M 1/308 250/231.18 |
| 6,246,050 B1 * | 6/2001 | Tullis | ............... | G01D 5/347 250/231.13 |

* cited by examiner

*Primary Examiner* — Seung C Sohn
(74) *Attorney, Agent, or Firm* — Alleman Hall McCoy Russell & Tuttle LLP

(57) ABSTRACT

Various embodiments related to a cart movement detection system for a dynamics track are disclosed. One disclosed embodiment includes a cart movement detection system for a cart on a dynamics track comprising an encoder system comprising a sensor system on the cart configured to read an encoder scale on the dynamics track and produce quadrature outputs representing an increment of movement of the cart on the dynamics track. The encoder system is further configured to obtain and encode pulse information from the quadrature outputs and transmit the encoded pulse information over an infrared channel. The cart movement detection system further includes a receiver system configured to receive the encoded pulse information transmitted over the infrared channel from the encoder system and determine from the encoded pulse information a direction of the increment of movement of the cart.

20 Claims, 5 Drawing Sheets

CART MOVEMENT DETECTION SYSTEM FOR A DYNAMICS TRACK

CROSS REFERENCE TO RELATED APPLICATIONS

This application claims priority to U.S. Provisional Patent Application No. 61/923,597, entitled CART MOVEMENT DETECTION SYSTEM FOR A DYNAMICS TRACK, filed Jan. 3, 2014, the entirety of which is hereby incorporated herein by reference.

BACKGROUND

Dynamics tracks are used in physics education to investigate concepts in kinematics and dynamics, including Newton's laws. To measure the position and motion of a cart on such a track, various methods can be used including marking the motion on a ticker tape or analyzing the motion of the cart when passed through a photogate or pair of photogates.

More recently, ultrasonic sensors have been used to track such motion by generating a high frequency sound wave and listening for the echo from the cart to determine the distance to the cart. These ultrasonic sound waves are often emitted in a wide beam and therefore are subject to interference and detection of stray objects. Noisy and erratic data may result if there are too many hard reflecting surfaces in the environment or if interference is present, such as from other ultrasonic units in the classroom.

SUMMARY

Various embodiments related to a cart movement detection system for a dynamics track are disclosed. One disclosed embodiment includes a cart movement detection system for a cart on a dynamics track, the cart movement detection system including an encoder system with a sensor system on the cart configured to read an encoder scale on the dynamics track and produce quadrature outputs representing an increment of movement of the cart on the dynamics track. The encoder system is further configured to obtain and encode pulse information from the quadrature outputs and transmit the encoded pulse information over an infrared channel. The cart movement detection system further includes a receiver system configured to receive the encoded pulse information transmitted over the infrared channel from the encoder system and determine from the encoded pulse information a direction of the increment of movement of the cart.

DETAILED DESCRIPTION

The present disclosure is directed to a cart movement detection system for a dynamics track. In particular, an encoder-based system for acquiring the cart's incremental movement on the track is disclosed. This information may then be provided to a data-collection interface for monitoring the motion of the cart. The disclosed cart movement detection system provides a cost-effective and robust system for consistent and accurate tracking of the cart, even when other objects are nearby, including other cart movement detection systems.

Figure 1:
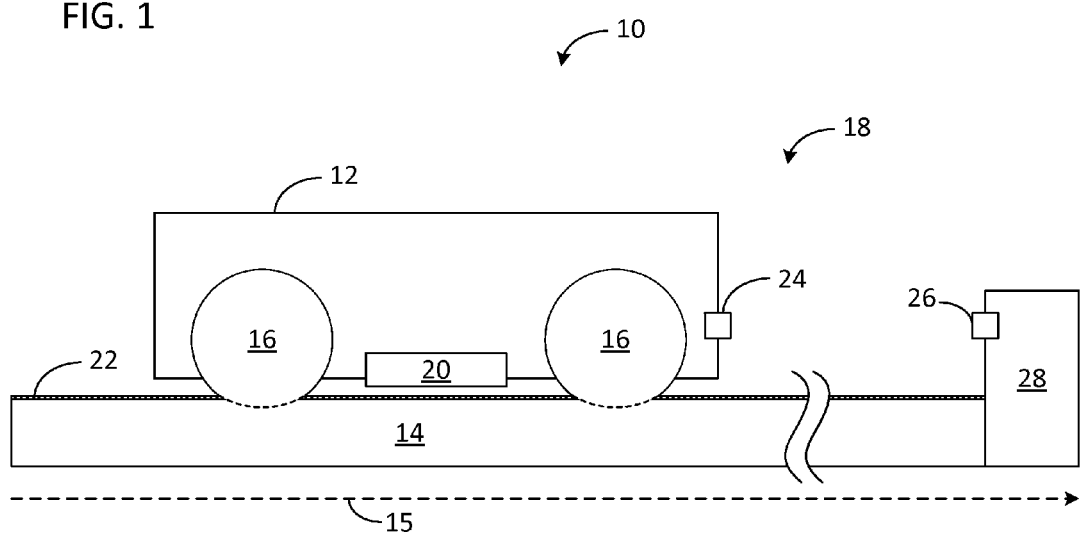
FIG. 1 schematically shows an embodiment of an example cart movement detection system for a dynamics track.

FIG. 1 shows a nonlimiting example of a cart movement detection system 10 for detecting the movement of a cart 12 along a dynamics track 14. Dynamics track 14 may be made of any suitable materials that are rigid and do not sag under use, including but not limited to anodized aluminum. Such materials may also be selected based on their frictional properties and/or other attributes. Further, dynamics track 14 may be any suitable length for performing kinematics and dynamics experiments. In some embodiments, dynamics track 14 may be approximately one to two meters.

Dynamics track 14 includes substantially parallel grooves running the length of the track in which cart 12 moves with extremely low friction. In the embodiment depicted in FIG. 1, the grooves extend along a longitudinal axis 15 of dynamics track 14. In particular, wheels 16 of cart 12 may be machined to be highly round, unlike molded wheels, to fit within the grooves on dynamics track 14. To better enable low-friction contact with dynamics track 14, cart 12 may further include shielded bearings.

To determine the incremental movement of cart 12, cart movement detection system 10 includes an encoder system 18. In the embodiment illustrated in FIG. 1, encoder system 18 includes a sensor system 20 located on the underside of cart 12. Sensor system 20 is configured to read an encoder scale 22 located on dynamics track 14 and running substantially the length (e.g., 90% or greater of the entire length) of dynamics track 14 parallel to longitudinal axis 15, as cart 12 passes over encoder scale 22. It should be appreciated that this configuration of encoder system 18 is nonlimiting and that alternate encoder system configurations are possible; for example, the scale may be located on the underside of the cart with the sensor system located on the track, as described in more detail below with reference to FIGS. 4-5.

Continuing with FIG. 1, sensor system 20 is configured to detect the pattern on encoder scale 22. As a nonlimiting example, encoder scale 22 may include a bar pattern comprising equivalently sized segments. The optical properties of the segments may alternate as dynamics track 14 is traversed, such that a first segment in a pair of successive segments may have a first set of optical properties while the other second segment in the pair of segments has a second set of optical properties that differ in some way from the first set of optical properties. The difference between the first and second set of optical properties may be used to distinguish the segments, thereby enabling detection of track motion. In some examples, the segments may differ with respect to their reflective properties—e.g., a highly reflective white segment having a first reflectivity may be distinguished from a neighboring less reflective dark segment having a second, relatively less reflectivity when the segments are illuminated. Using this information from sensor system 20, encoder system 18 then produces a stream of pulses (e.g., square wave pulses) which, when processed, indicate the incremental movement of cart 12 along dynamics track 14.

In some examples, the segments may be equally spaced throughout dynamics track 14. Alternative implementations are possible, however, in which encoder scale 22 includes a bar pattern comprising segments that are unequally spaced. Segments having alternating optical properties that allow the segments to be distinguished from one another may be spaced according to various suitable unequal spacings that, in some examples, allow the absolute position of cart 12 along dynamics track 14 to be determined. As a nonlimiting example, a unique spacing may be provided for each predetermined spatial increment along dynamics track 14—e.g., every 40 mm. Equal spacings may be provided between each spatial increment such that detection of a unique unequal spacing, in combination with a count of the number of equal spacings detected after detection of the unique unequal spacing, provides an indication of the absolute position of cart 12 along dynamics track 14.

In order to send the pulse information from encoder system 18 on cart 12 to a data-collection interface that performs motion analysis of cart 12, the information may be transmitted so as not to interfere with the motion of cart 12 or introduce friction. Such interference and/or friction may otherwise affect the kinematics and/or dynamics experiments being investigated in the cart/track system, in turn reducing the integrity of collected data. As such, encoder system 18 further includes a source 24 to wirelessly transmit the pulse information to a detector 26 located at a fixed receiver system 28. The receiver system 28 may then connect to the data-collection interface in any suitable manner, including but not limited to connecting via a cable, wireless transceiver, etc.

Figure 2:
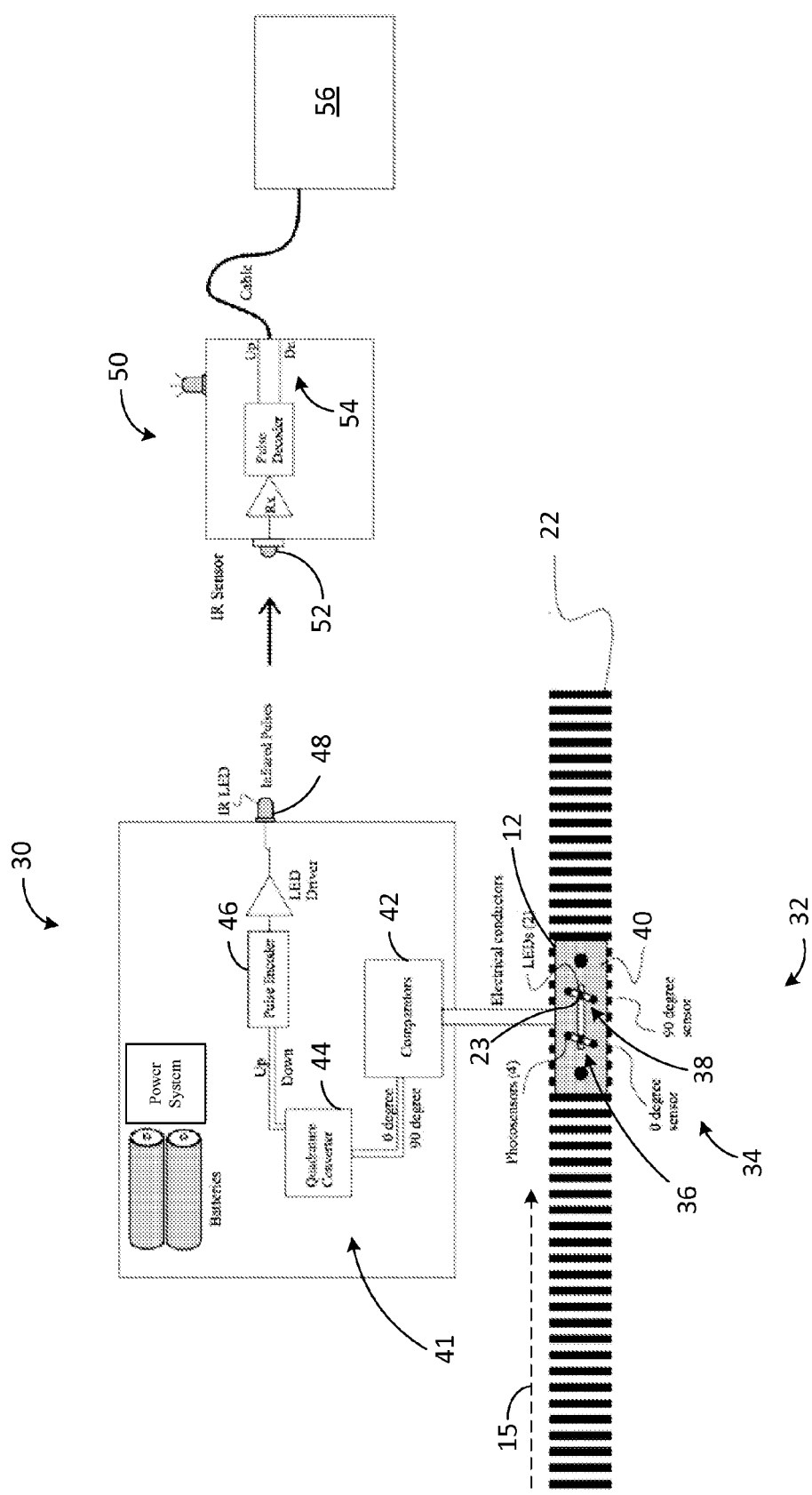
FIG. 2 schematically shows an embodiment of an example encoder system and example receiver system for the cart movement detection system of FIG. 1.

Encoder system 18 may be configured in any suitable manner to read the bar pattern of encoder scale 22 and transmit the pulse information to the data-collection interface. FIG. 2 illustrates one embodiment of an encoder system 30 that utilizes a sensor system 32 having an encoder module 34 with two differential pairs of photosensors—a first differential pair 36 and a second differential pair 38—for a total of four discrete photosensors. As cart 12 passes over encoder scale 22, a light source 23 positioned on the cart illuminates the pattern near each pair and the photosensors read the bar pattern of encoder scale 22 using an optical mask 40 mounted to cart 12. As such, each photosensor may report reading either a white bar or a dark bar of encoder scale 22.

Light source 23 may assume various suitable forms. In some embodiments, light source 23 may be a light emitting diode (LED). The LED may be configured to emit various wavelengths of light, such as infrared and/or visible wavelengths. Use of an infrared light source may reduce the extent to which noise is added to signals generated by the photosensors due to ambient light. However, the photosensors may generate signals of sufficient signal-to-noise ratio (SNR) for wavelengths of light other than infrared wavelengths, for example in part due to partial blockage of ambient light by the cart and the positioning of the photosensors. The photosensors may be configured to sense wavelengths that approximately correspond to those emitted by light source 23; for example, the photosensors may be configured to sense infrared light for implementations in which the light source emits infrared light. Further, while a single light source is shown as being provided for each pair of photosensors, it will be appreciated that two or more light sources may be provided for each pair of photosensors. In some embodiments, unequal numbers of light sources may be provided for each pair of photosensors. Each light source may be placed in various suitable locations relative to its corresponding photosensors; while light source 23 is shown in FIG. 2 as being interposed between its corresponding pair of photosensors, the light source may be placed elsewhere (e.g., closer to one photosensor of the pair of photosensors and farther away from the other photosensor of the pair of photosensors). Use of a single light source for each pair of photosensors, however, may reduce power consumption and increase the uniformity of emitted light relative to other configurations.

In the embodiment illustrated in FIG. 2, the photosensors in each pair are positioned to obtain quadrature outputs. In other words, first differential pair 36 and second differential pair 38 are 90 degrees (or nonzero multiples thereof) apart with respect to each other.

As a nonlimiting example, the bar pattern of encoder scale 22 may include bars of width 2 mm. In such a case, photosensors within a differential pair may be spaced apart along longitudinal axis 15 by 2 mm to be complimentary with each other. Additionally, the photosensors within a differential pair may be spaced apart from photosensors of another differential pair by an odd integer number of millimeters (e.g., 7 mm, 9 mm, etc.) to be in quadrature. In this way, sensor system 32 obtains quadrature outputs which are 90 degrees out of phase. Such an encoder module 34 having a two-phase quadrature detector may thus have a resolution of 1 mm.

It should be appreciated that the larger scale of the bar pattern allows encoder scale 22 to be printed using standard, cost-effective printing techniques on the order of less than two dollars per meter. Other components of encoder system 30 are also inexpensive. For example, optical mask 40 may be formed from a substantially opaque material by any suitable method including but not limited to molding or machining. As such, encoder system 30 is cost-effective for the classroom environment. Further, it should be appreciated that sensor system 32 fits easily on a standard dynamics cart which may be used in such a classroom.

Additionally, the discrete implementation of encoder system 30 allows each photosensor of encoder module 34 to read only one bar of encoder scale 22. This particular alignment and spacing causes encoder system 30 to operate at a lower resolution than commercially available encoder systems, yet be optically more tolerant of skew, focus, etc. This is because commercially available encoder systems employ an integrated implementation having a narrow pitch, with sensors that read multiple narrow bars.

Further, encoder system 30 may be significantly lower in cost than commercially available encoder systems. Typically, the encoder scale of a commercially available system is created by a photo process to produce the required accuracy and a mirror surface, in order to gather enough light from the very small bars (e.g., 180 bars per inch) dictated by the higher resolution of the system. Such a photo process can be can be expensive—over $100 per meter— making commercial encoder systems too expensive for a classroom implementation.

As such, it should be appreciated that disclosed encoder system 30 not only employs a configuration that is cost-effective with adequate resolution, but its tolerance to spacing, angular misalignment, and debris on the track allows for consistent and accurate tracking of the motion of cart 12.

Continuing with FIG. 2, encoder system 30 is configured to process the quadrature outputs from sensor system 32 to determine the pulse information, as indicated at 41. As a nonlimiting example, encoder system 30 may include comparators 42 configured to receive the signals from the differential sensor pairs 36 and 38 of encoder module 34 and convert the signals to logic signals for the 0 degree and quadrature (90 or 270 degree) phases. Encoder system 30 is further configured to send the logic signals to a quadrature converter chip 44 that translates the phase data into up or down pulses indicating every 1 mm of motion in a left or right direction, respectively. The up (i.e., left) and down (i.e., right) pulses are encoded by timers 46 that generate different length pulses for each direction (i.e., different length pulses for the left and right directions, respectively). As a nonlimiting example, one direction may be indicated by a 20 µs pulse and the other direction by a 55 µs pulse. Encoder system 30 further includes an infrared LED 48 configured to turn on for the duration of each pulse, for each millimeter of cart movement detected. Thus, in some examples, encoded pulse information may be transmitted over a single infrared channel via infrared LED 48.

It should be appreciated that encoder system 30 may receive power from any suitable power system to process these quadrature outputs, including but not limited to batteries, transformers, etc. Moreover, LED 48 may output non-infrared wavelengths of light alternatively or in addition to infrared light, which may include the utilization of one or two or more channels to transmit encoded pulse information.

As illustrated in FIG. 2, a receiver system 50 detects the infrared pulses from infrared LED 48 with a PIN photodiode 52. Receiver system 50 is configured to amplify and decode the received signal. Receiver system 50 may do so in any suitable manner, such as by using timers to compare the pulse length to determine whether it is a long or short pulse. As a nonlimiting example, receiver system 50 may include a pulse width discriminator to sort the pulses.

Receiver system 50 may be further configured to reject noise pulses that are too long or too short. As such, receiver system 50 may output a single pulse for every 1 mm of cart movement. Receiver system 50 may be configured to output these pulses in any suitable manner, such as to output a pulse via a first signal path (e.g., a first wire) indicating left movement and output a pulse via a second signal path (e.g., a second wire) to indicate right movement, as illustrated at 54. In such an embodiment, the length of the pulses may be the same for both signal paths, for example, approximately 2 µs.

The first and second signal paths may be coupled to a data-collection interface 56. In this way, receiver system 50 can send the left and right movement information for cart 12 to data-collection interface 56 configured to count these pulses and thus monitor the motion of cart 12. Data-collection interface 56 may then, for example, track, record, and/or display the movement of the cart, allowing students to study the motion of cart 12. Data-collection interface 56 may be any suitable computerized data collection system including but not limited to a Vernier® LabQuest® 2, LabQuest®, LabQuest® Mini, and LabPro®.

In some examples, data-collection interface 56 may determine other properties of cart 12 in addition to the direction of its motion. For example, interface 56 may determine one or more of the speed, velocity, acceleration, jerk, momentum, etc. Determination of these and/or other parameters may involve a comparison of pulses to a clock.

Because cart 12 travels in a straight line along dynamics track 14, alignment may be substantially maintained between infrared LED 48 and PIN photodiode 52. Further, infrared LED 48 can be configured to direct a narrow infrared beam to PIN photodiode 52, which excludes interference and ambiguity in the signal. As such, multiple cart detection systems may be utilized in the same classroom, unlike other cart detection systems that utilize ultrasonic technologies that are therefore subject to interference from other units, as well as other objects such as fans. Additionally, the disclosed cart movement detection system may be used with other types of dynamics track, such as air tracks, since the ultrasonic noise of such an air track does not cause interference for the disclosed system. Further, since the disclosed cart movement detection system obtains digital data, it does not rely on analog detection of echo return, thus reducing noise.

Additionally, subsequent analysis by the data-collection interface of such low-noise data obtained by the disclosed cart detection system may also be substantially low-noise. This is because such analysis typically utilizes numerical differentiation, which is noise sensitive. As such, a low-noise input yields a low-noise output. This is unlike data obtained by traditional ultrasonic detectors that obtain reflections from detecting different surfaces on the cart as it moves, thus introducing additional noise in the measurement and subsequent analysis.

It should be appreciated that by using infrared light to transmit the signal from encoder system 30 to receiver system 50, no binding, pairing, or addressing is utilized. This allows teachers or students in the classroom to easily set up the disclosed cart movement detection systems and allows students to immediately have hands-on time with such systems. This lack of pairing also makes it easy for teachers or students to swap out encoder-equipped carts between tracks for different experiments, such as carts carrying different masses.

Figure 3:
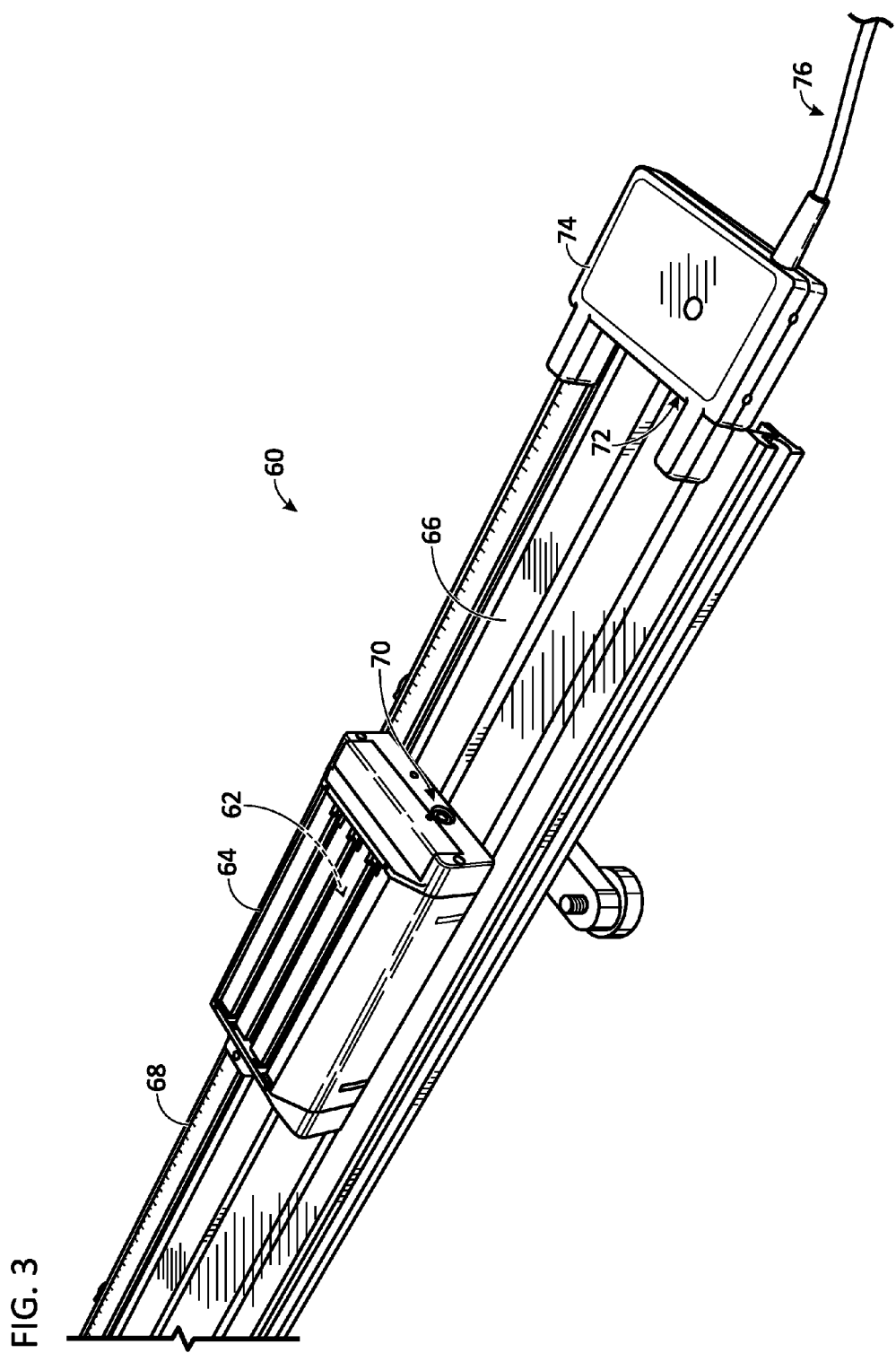
FIG. 3 shows an embodiment of the example cart movement detection system of FIG. 1.

Turning now to FIG. 3, an example cart movement detection system 60 for such a classroom is illustrated. Here, the encoder system 62 is mounted on the underside of a cart 64, and an encoder scale 66 is mounted to a top surface of dynamics track 68. An infrared LED 70 located at an end of the cart 64 transmits encoded pulse information to a PIN photodiode 72 positioned on a receiver system 74 that is fixed to track 68. The left and right movements of cart 64 as decoded by receiver system 74 can then be sent to a data collection interface (not shown) via cable 76. In this way, the cart's movement is easily tracked and sent to the data collection interface without wires interfering with the cart's movement.

It should be appreciated that the cart movement detection systems illustrated in FIGS. 1-3 are nonlimiting. An encoder system may be configured alternately in other embodiments, as described in more detail hereafter.

Figure 4:
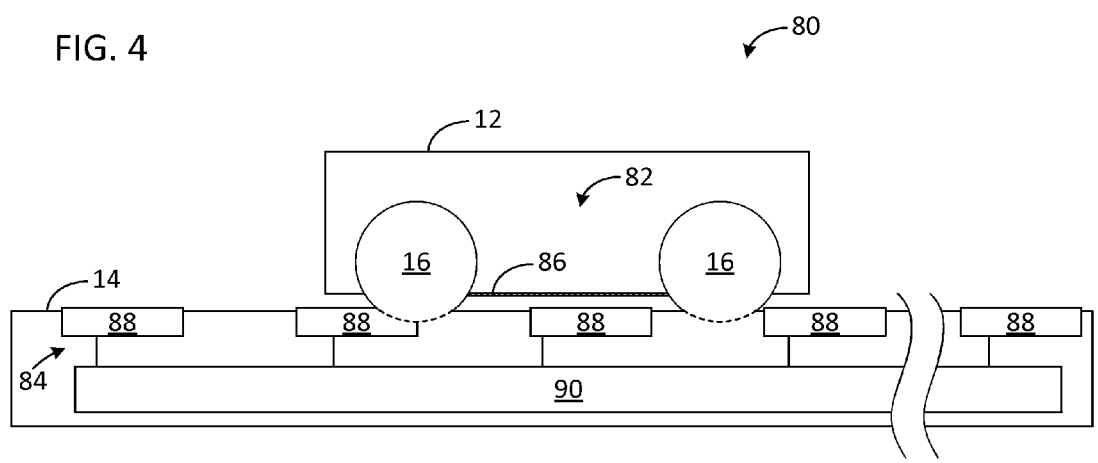
FIG. 4 schematically shows another embodiment of an example cart movement detection system for a dynamics track.

Turning now to FIG. 4, another embodiment of an example cart movement detection system 80 for dynamics track 14 is shown. In this embodiment, encoder system 82 of cart movement detection system 80 includes a sensor system 84 embedded in track 14 and configured to read an encoder scale 86 on the underside of cart 12, as cart 12 moves along dynamics track 14. In this configuration, encoder scale 86 is much shorter than the range of movement of cart 12 along dynamics track 14. As such, sensor system 84 includes a plurality of encoder modules 88 distributed on track 14 along the path of cart 12. In particular, encoder modules 88 are spaced such that at least one encoder module 88 is reading encoder scale 86 on cart 12 at any given time. As such, the maximum spacing between adjacent encoder modules 88 is less than the length of encoder scale 86.

Each encoder module 88 includes two differential pairs of photosensors, for a total of four discrete photosensors. It should be appreciated that each encoder module 88 is configured to obtain quadrature outputs as described herein with reference to encoder module 34 of FIG. 2. As such, each encoder module 88 is configured to read encoder scale 86 on cart 12 and indicate the cart's movement in a particular direction.

Continuing with FIG. 4, cart movement detection system 80 further includes a logic system 90 configured to combine the left and right pulses from encoder modules 88, such that a single pulse is generated for each increment (e.g., each millimeter) of movement of cart 12. Logic system 90 may be configured to combine and/or commute the pulses in any suitable manner, including but not limited to using logical OR gates to provide a partial solution to this function. It should be appreciated that when cart 12 is moving slowly, phase errors may cause data pulses from adjacent encoder modules to be widely separated in time, which could result in double counting of the data. As such, logic system 90 may further include additional logic to reject the erroneous data.

Further, since encoder modules 88 may be exposed to ambient room lighting in the classroom, for example, cart movement detection system 80 may further include a disabling system to disable encoder modules not under encoder scale 86. Such a disabling system may be configured in any suitable manner, including but not limited to utilizing an ambient light sensor and/or magnetic proximity switches.

Figure 5:
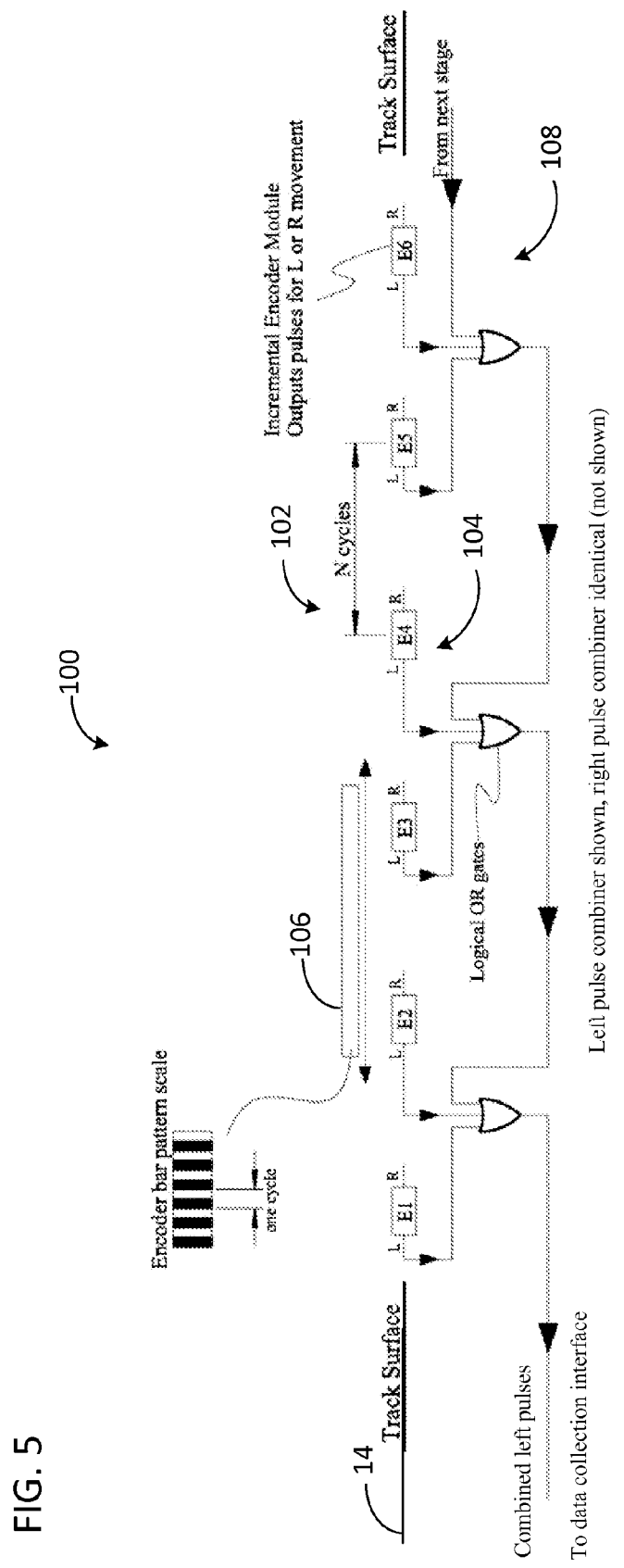
FIG. 5 schematically shows an embodiment of an example encoder system and an example logic system for the cart movement detection system of FIG. 4.

FIG. 5 illustrates an embodiment of an example encoder system 100. Here, sensor system 102 includes a plurality of encoder modules E1, E2, . . . , En, as indicated at 104, configured to read encoder scale 106 located on the underside of cart 12 (FIG. 4). Encoder modules 104 may be spaced an integer number of cycles apart. As a nonlimiting example, for an encoder scale 106 having a bar pattern of equivalently sized white and dark bars of width 2 mm, the cycle length is 4 mm. In such a case, the encoder modules may be spaced apart by an integer multiple of 4 mm, such as 80 mm or 120 mm for an encoder scale of length 140 mm. Locating encoder modules 104 spatially in-phase ensures that their data will also be in-phase, and therefore allows their data to be logically combined by logic system 108. In some embodiments, logic system 108 may include a first system for combining the left (i.e., up) pulses and a second system for combining the right (i.e., down) pulses.

Logic system 108 may then provide the resulting incremental cart movement data to a data-collection interface (not shown) for analyzing the motion of the cart. Because encoder modules 104 of encoder system 100 are located on track 14 in this embodiment, movement data need not be transmitted from cart 12. Rather, the data-collection interface may be connected directly to logic system 108 in track 14 by a cable, for example, ensuring consistent and accurate tracking of the cart.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A cart movement detection system for a cart on a dynamics track, comprising:

an encoder system comprising a sensor system on the cart configured to read an encoder scale on the dynamics track and produce quadrature outputs representing an increment of movement of the cart on the dynamics track, the encoder system further configured to obtain and encode pulse information from the quadrature outputs and transmit the encoded pulse information over an infrared channel; and a receiver system configured to receive the encoded pulse information transmitted over the infrared channel from the encoder system and determine from the encoded pulse information a direction of the increment of movement of the cart.

2. The cart movement detection system of claim 1, wherein the encoder scale includes a bar pattern comprising equivalently sized segments.

3. The cart movement detection system of claim 2, wherein a first segment in a pair of successive segments has a first reflectivity, and wherein a second segment in the pair of successive segments has a second reflectivity, the second reflectivity less than the first reflectivity.

4. The cart movement detection system of claim 1, wherein the encoded pulse information is transmitted by an infrared LED.

5. The cart movement detection system of claim 1, wherein the encoded pulse information is received by a PIN photodiode.

6. The cart movement detection system of claim 1, wherein the sensor system includes two differential pairs of photosensors.

7. The cart movement detection system of claim 6, wherein the two differential pairs of photosensors are a nonzero multiple of 90 degrees apart with respect to each other.

8. The cart movement detection system of claim 1, wherein the encoder system encodes track motion in a left direction with an up pulse, and track motion in a right direction with a down pulse.

9. The cart movement detection system of claim 8, wherein the up and down pulses are encoded by timers that generate different length pulses for the left and right directions, respectively.

10. The cart movement detection system of claim 1, wherein the encoder system comprises:

comparators configured to convert signals received from differential sensor pairs to logic signals;

a quadrature converter that translates the logic signals to up and down pulses; and timers that generate different length pulses for the up and down pulses, respectively.

11. The cart movement detection system of claim 1, wherein the receiver system is further configured to output a pulse via a first signal path indicating left movement of the cart, and to output a pulse via a second signal path indicating right movement of the cart.

12. The cart movement detection system of claim 11, wherein the first and second signal paths are coupled to a data-collection interface.

13. The cart movement detection system of claim 12, wherein the data-collection interface is configured to track, record, and/or display movement of the cart.

14. A cart movement detection system for a cart on a dynamics track, comprising:

an encoder system comprising a sensor system on the dynamics track configured to read an encoder scale on the cart and produce quadrature outputs representing an increment of movement of the cart on the dynamics track, the encoder system further configured to obtain pulse information from the quadrature outputs; and a logic system configured to combine the pulse information into a single pulse indicating a direction of the increment of movement of the cart.

15. The cart movement detection system of claim 14, wherein the logic system is configured to generate a single pulse for each increment of movement of the cart.

16. The cart movement detection system of claim 14, wherein the sensor system is located on an underside of the cart.

17. The cart movement detection system of claim 14, wherein the quadrature outputs are produced by two differential pairs of photosensors.

18. A system for analyzing motion of a cart along a dynamics track, comprising:

a light source configured to illuminate a pattern;

one or more photosensors configured to read the illuminated pattern as the cart undergoes motion along the dynamics track; and an encoder system configured to receive signals from the photosensors and generate encoded pulse information based on the received signals, the encoded pulse information indicating a velocity of the cart.

19. The system of claim 18, wherein the one or more photosensors are embedded in the track, and wherein the pattern is located on an underside of the cart.

20. The system of claim 18, wherein the one or more photosensors are located on an underside of the cart, and wherein the pattern is embedded in the track.

* * * * *